United States Patent Office 3,130,062
Patented Apr. 21, 1964

3,130,062
SEALING COMPOSITION AND A PROCESS OF
MAKING IT
Charles T. Rairdon, Somerville, Manuel R. Ximenez, Plainfield, and William E. Hanson, East Brunswick, N.J., assignors to Johns-Manville Corporation, New York, N.Y., a corporation of New York
No Drawing. Filed Oct. 25, 1960, Ser. No. 64,710
4 Claims. (Cl. 106—171)

The present invention relates to a new composition of matter and more particularly to a composition useful as a sealing compound. More specifically this invention relates to certain types of sealing compounds prepared from hydroxylated vegetable oils which materials have found considerable use as insulating compositions.

The transmission of high voltages, such as those used in the power and communication fields, has established a need for effective insulating materials. Because of their high dielectric loss characteristics, mineral oils, vegetable oils and the like have been successfully used in sealing compositions for many years past. The compositions are generally of such a physical nature as to allow extrusion into the cable at the time of manufacture. This procedure permits filling of substantially all of the voids between the wires and the cable sheathing.

In addition to these necessary electrical properties, the sealing compound must be characterized by other electrical and physical properties. It is highly desirable that the sealant also possess high insulation, low specific inductive capacity and low power factor. At the same time it is important to possess high resistance to ozone and attack by chemical agents, such as alkalies, acids and the like. Other desirable physical properties include high moisture resistance, good aging characteristics, high tensile strength, and satisfactory softening points and cold flow properties. Among these latter properties it is most important that the composition possess a sufficiently low enough viscosity to permit extrusion.

However, it has been found that this general class of materials when possessing a sufficiently low enough viscosity are accompanied by a relatively poor resistance to slumping or running after application. Furthermore, certain military specifications, e.g., MIL-C-915A, dated July 30, 1952, require that no compound or vehicle used to insulate military cables shall drip from a length of a finished cable when heated under specific conditions. More specifically, section 4.8.8 of this particular military specification prescribes that each specimen of each size of cable size 14 or larger and degaussing cable size 19(6) shall be suspended in a vertical position in an oven maintained for a period of not less than 18 hours at 95° C. and that no material, i.e. sealant, shall drip or exude from the end of the cable during that test.

It is therefore, a primary object of this invention to provide a sealing compound which has the desirable properties mentioned above while overcoming the above disadvantages.

It is another object of this invention to provide a sealing compound which has a low enough viscosity to permit application by conventional means while maintaining high yield strength under heat and pressure conditions.

A further object of this invention is to provide a cable insulating composition that is physically stable and maintains its properties under both electrical stress and elevated temperature conditions.

It is another object of this invention to provide a sealant which has excellent resistance to aging or hardening and is also resistant to oxidation and to corrosive material, such as alkalies, etc.

It is an additional object of this invention to provide a relatively inexpensive sealing compound which will satisfy all present specifications.

To the accomplishment of these objects and such others as may hereafter appear, the invention comprises the features set out in the following description.

It has been discovered that the above objects may be accomplished in accordance with this invention by providing a sealing compound generally comprising a hydroxylated vegetable oil, such as castor oil, an inert filler, such as asbestos fiber, and a relatively small amount of a stiffener, such as ethyl cellulose. When tested, the above composition showed excellent resistance to slumping or running after application.

The hydroxylated vegetable oil utilized in the base vehicle formed in accordance with this invention is preferably raw or blown castor oil. Any conventional inert filler material, such as talc, silica, whiting, etc., may be utilized in place of the asbestos fiber. A sealing compound formed from these two elements will be characterized by the desired low viscosity but possesses the disadvantages explained above, i.e., slumping, etc.

An extensive study was therefore undertaken to modify the properties of the constituents in order to increase the resistance to slumping while maintaining a sufficiently low viscosity.

The castor oil was modified in the laboratory, both physically and chemically. It was heat bodied under the influence of a catalyst and reacted with various acids, bases, and organic intermediates in an effort to produce a more viscous, heat-stable vehicle. Various physical modifiers were also used with the oil in an attempt to obtain the same end. Additionally, the castor oil was gelled with metallic soaps and bodied with aerogel thickeners. Also tested were several wetting agents and viscosity index improvers. However, none of the above proved satisfactory in complying with the above-cited military specification.

It was then found that additions of a relatively small amount of stiffener produced a composition having a substantially increased yield strength without the heretofore observed deleterious alteration of the extrudability. Such a stiffener comprises a linear polymeric material which is compatible with the hydroxylated vehicle. Linear polymeric materials which fall within the scope of this invention and impart the desired yield resistance to the composition without substantially increasing its consistency, are typified by such materials as ethyl cellulose, nitrocellulose, cellulose acetate butyrate, polyvinyl chloride, polyvinyl acetate, polyvinyl alcohol, polyamide, etc., and natural resins or compounds such as rosin, shellac, gum dammar, etc. The stiffeners are generally used in proportions of about 1 to 25% by weight of the hydroxylated vegetable oil. Five percent of ethyl cellulose has proved to be quite satisfactory. However, depending on the desired consistency and on the raw materials used, the amount of stiffener may be varied.

The stiffeners are incorporated into the castor oil by stirring under high shear stresses and/or by heating. The linear polymers are added to the castor oil cold, with stirring, and heat is subsequently applied. The heat greatly facilitates the solution of the stiffener.

After the stiffener has been incorporated into the hydroxylated oil, the inert filler is added to form a sealant of uniform composition. The amount of filler added to the base vehicle depends upon the consistency desired of the ultimate composition. Generally, the filler comprises approximately 25 to 75% by weight of the sealing compound.

The following is an example of an improved sealant representing the instant invention.

Five percent by weight by ethyl cellulose (ethyl cellulose N-10, 13 centipoises, supplied by Hercules Powder Company) was added to a No. 3 castor oil. The composition was stirred in a Baker-Perkins mixer to disperse the materials into a uniform composition. Steam was applied to the mixer jacket and blades to 50 p.s.i.g. The mixing was continued until the batch mixture reached a temperature of 275° F. The mixture was then allowed to cool to 180° F. To the batch was added a quantity of asbestos fiber which totaled 54% by weight of the total mixture. The batch was mixed for ten minutes. A viscous, knife grade sealant resulted, i.e., one which is spreadable by conventional putty knives, etc., but is too viscous and resistant to flow in conventional calking guns.

A test device was prepared which is similar in principle to an oil press. A weighed amount of the sealant material was placed in the press. Under the influence of heat and pressure, the vehicle tends to separate from the sealing compound. The resistance of the compound to vehicle separation is a measure of stability and resistance to dripping as tested under the above-mentioned military specification. The composition was tested at 95° C. at a constant pressure. The length of time required for vehicle separation was a measure of the stability of the compound. The composition of the instant invention as made according to the above procedure was compared under the same test conditions with Permagum 578.3 compound, which was known to pass the military drip-test. The Permagum composition failed within 15 minutes, while the improved composition of the instant invention showed only a trace of vehicle separation at the end of 30 minutes.

Successive batches of the improved composition were prepared including the stiffener which preparation was according to the above description and were found to be relatively uniform in separation. The batches, when tested in the press, were consistently good in performance. Separation of the base under the influence of heat and pressure required 30 or more minutes of exposure.

It is believed the above provides a complete description of the invention in such manner as to distinguish it from other inventions and from what is old, and provides a description of the best mode contemplated of carrying out the invention and thereby complies with the patent statutes. It is to be understood that in accordance with further provisions of the patent statutes, variations and modifications of the invention, as illustrated by specific examples herein, may be made without departing from the spirit of the invention. It is to be understood that the invention is not limited to the specific embodiments thereof, except as defined in the appended claims.

What we claim is:

1. A sealant composition consisting essentially of hydroxylated vegetable oil, about 1 to about 25% by weight of the vegetable oil of an ethyl cellulose stiffener, and between about 25% to about 75% by weight of an inert filler based on the total weight of the sealant, said sealant composition characterized as non-slumping when tested in accordance with military specification MIL-C-915A.

2. A sealant composition consisting essentially of by weight, about 44% castor oil, about 54% asbestos fiber, and about 2% ethyl cellulose, said sealant composition being non-fluid when tested according to military specification MIL-C-915A.

3. A process for preparing a sealant compound characterized as non-slumping when tested according to military specification MIL-C-915A, comprising mixing a castor oil with between 1 and 25% by weight of ethyl cellulose until a uniform composition results, and adding thereto between 25 and 75% by weight inert filler, with mixing, to produce a low viscosity composition.

4. A process for preparing a sealant characterized as non-slumping when tested in accordance with military specification MIL-C-915A, comprising mixing by weight, about 95% castor oil with 5% ethyl cellulose to produce a uniform composition and adding thereto asbestos fiber to constitute about 54% by weight of the resulting composition.

References Cited in the file of this patent

UNITED STATES PATENTS

| | | |
|---|---|---|
| 1,285,889 | Andersen | Nov. 26, 1918 |
| 1,831,707 | Gardner | Nov. 10, 1931 |
| 2,873,265 | Rust | Feb. 10, 1959 |